(12) United States Patent
Betz et al.

(10) Patent No.: US 9,034,226 B2
(45) Date of Patent: May 19, 2015

(54) INJECTION MOULDING METHOD FOR OPTIONAL MANUFACTURING OF MOULDED PARTS WITH OR WITHOUT A BREAKTHROUGH

(75) Inventors: Joachim Betz, Aalen (DE); Norbert Gerstner, Herbrechtingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 354 days.

(21) Appl. No.: 13/233,053

(22) Filed: Sep. 15, 2011

(65) Prior Publication Data

US 2012/0074606 A1  Mar. 29, 2012

(30) Foreign Application Priority Data

Sep. 29, 2010  (DE) .................. 10 2010 041 681

(51) Int. Cl.
| | | |
|---|---|---|
| B29C 45/00 | (2006.01) | |
| B29C 45/26 | (2006.01) | |
| B29C 45/37 | (2006.01) | |

(52) U.S. Cl.
CPC ........... B29C 45/2628 (2013.01); B29C 45/376 (2013.01)

(58) Field of Classification Search
CPC ............ B29C 45/2628; B29C 33/0033; B29C 45/376; B29C 45/36; B29C 45/2675; B29C 2045/363; B29C 2045/366
USPC ............. 425/577, 183, 195; 249/68, 178, 184
See application file for complete search history.

(56) References Cited

U.S. PATENT DOCUMENTS

| | | | | |
|---|---|---|---|---|
| 3,315,317 | A * | 4/1967 | Winkler | 425/119 |
| 3,968,951 | A * | 7/1976 | Zeman | 249/55 |
| 4,342,549 | A * | 8/1982 | Lemelson | 425/150 |
| 4,420,297 | A * | 12/1983 | Remon | 425/577 |
| 4,452,420 | A * | 6/1984 | Lundquist | 249/175 |

(Continued)

FOREIGN PATENT DOCUMENTS

| | | |
|---|---|---|
| EP | 1300446 A1 | 4/2003 |
| EP | 1602623 A1 | 12/2005 |

(Continued)

OTHER PUBLICATIONS

European Search Report EP 11 18 1338 dated Aug. 23, 2013.

(Continued)

*Primary Examiner* — Jill Heitbrink
(74) *Attorney, Agent, or Firm* — James E. Howard; Andre Pallapies

(57) ABSTRACT

An injection-molding method for selectively manufacturing molded parts with and without a breakthrough is disclosed. A molded part with a breakthrough is manufactured by positioning a mold core in a mold cavity, whereas a molded part without breakthrough is manufactured by removing the mold core at least partly from the mold cavity. The mold cavity delimited by a nozzle-side mold platen and an ejector-side mold platen. The mold core is movable relative to at least one of the mold platens, in particularly the nozzle-side mold platen, in an advance direction, where the mold core is closer to the nozzle-side mold platen and an opposite withdrawal direction.
At least one protective measure is provided for protecting the inner surface facing the mold cavity of the respective mold platen, in particularly the nozzle-side mold platen, from adverse mechanical effects during movement of the mold core in the advance direction.

28 Claims, 7 Drawing Sheets

(56) References Cited

U.S. PATENT DOCUMENTS

| | | | |
|---|---|---|---|
| 4,861,534 A * | 8/1989 | Boehm et al. | 264/102 |
| 5,574,623 A * | 11/1996 | Girard | 361/627 |
| 5,662,946 A * | 9/1997 | Pratt et al. | 425/190 |
| 6,116,886 A * | 9/2000 | Tasaka | 425/183 |
| 6,224,362 B1 * | 5/2001 | Morita et al. | 425/125 |
| 7,156,632 B2 * | 1/2007 | Park et al. | 425/112 |
| 2004/0128831 A1 * | 7/2004 | Bretl et al. | 29/841 |
| 2006/0012078 A1 * | 1/2006 | Sutter | 264/334 |
| 2006/0057245 A1 * | 3/2006 | Haupt et al. | 425/589 |
| 2006/0207121 A1 * | 9/2006 | Lee | 34/89 |

FOREIGN PATENT DOCUMENTS

| | | |
|---|---|---|
| JP | H01171177 A | 7/1989 |
| WO | 03006221 A1 | 1/2003 |
| WO | 2004052541 A1 | 6/2004 |

OTHER PUBLICATIONS

European Search Report EP 11 18 1338 dated Jun. 19, 2013.

* cited by examiner

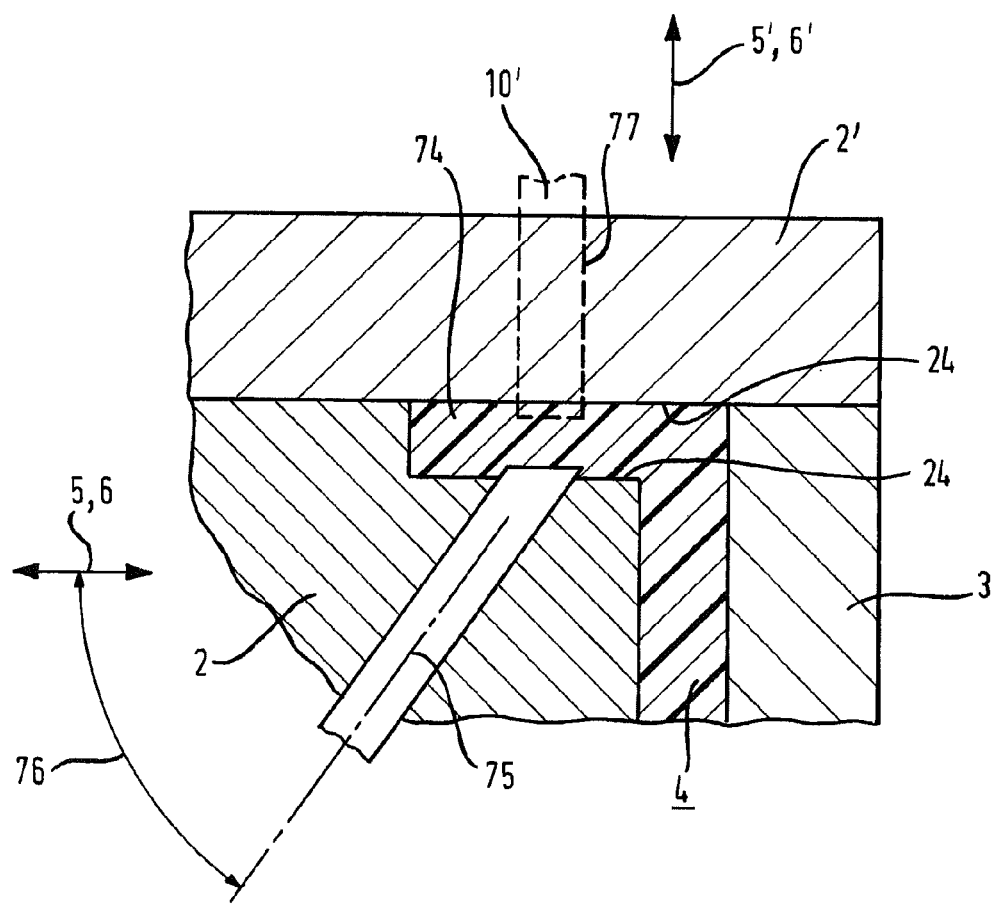

INJECTION MOULDING METHOD FOR OPTIONAL MANUFACTURING OF MOULDED PARTS WITH OR WITHOUT A BREAKTHROUGH

BACKGROUND OF THE INVENTION

The invention relates to an injection moulding method for optional manufacturing of moulded parts with and without a breakthrough, in which an injection-moulding tool is used, having a mould cavity delimited by at least one nozzle-side and at least one ejector-side mould platen and a mould core able to be at least partly positioned in the mould cavity, able to be moved relatively in relation to at least one of the mould platens, especially the nozzle-side mould platen in an advance and withdrawal direction, whereby said mould core is approached when moving in the advance direction by the respective other mould platen, especially the nozzle-side mould platen, and for a movement in the withdrawal direction, moves away from the latter, to manufacture a moulded part with breakthrough the mould core is positioned in the mould cavity and to manufacture a moulded part without breakthrough the mould core is removed at least partly from the mould cavity.

In a method of the type described above there is the danger that the mould core, when it comes up against the inner side of the other, especially the nozzle-side mould platen, at least after a long period of operation or after a plurality of injection-moulding shots and accompanying closed positions of the two mould platens, will leave a permanent impression on the inner side of the other, especially nozzle-side mould platen. This impression is evident on the corresponding side of the moulded part, which especially cannot be tolerated when this side is the visible side of the moulded part and is intended to have an optically attractive design, is a high-gloss part for example.

The invention relates especially to an injection-moulding method for optional manufacturing of moulded parts with and without breakthrough. An injection moulding tool is used for such a process, which comprises at least one mould cavity delimited by one or more nozzle-side and one or more ejector-side mould platens and a mould core able to be positioned in the mould cavity. A nozzle-side mould platen, which can consist of a number of part platens, is especially a mould platen such as is held in a fixed position on an injection-moulding machine and via which, with the aid of an injection channel, a molten liquid plastic mass is injected into the mould cavity. The injection-moulding tool can naturally also have a number of such mould cavities. Compared to the preferably fixed, preferably nozzle-side mould platen, the ejector-side mould platen can expediently be embodied as a movable part. The mould core can expediently be attached to it, preferably detachably or to allow relative movement.

Expressed in general terms, at least one first mould platen is thus able to be moved relative to a second mould platen. The mould core in such cases can be assigned to the first and/or second mould platen or especially in a particularly suitable manner in the mould cavity embodied between the at least two mould platens and delimited by them, to allow movement into and out of the cavity.

To manufacture a moulded part with a breakthrough the mould core is positioned in the mould cavity, i.e. it occupies an area of the cavity corresponding to the subsequent breakthrough. To manufacture a moulded part without breakthrough the mould core is at least partly removed from the mould cavity. The mould core used in the injection-moulding process is also movable in an advance and withdrawal direction, preferably against the other, especially nozzle-side mould platen, whereby, for a movement in the advance direction it moves closer to the other, especially nozzle-side mould platen and for a movement in the withdrawal direction moves away from the latter.

BRIEF SUMMARY OF THE INVENTION

An object of the invention is to propose an injection-moulding method and an injection-moulding tool suitable for said method, with which an adverse effect on the visible side of a moulded part as a result of an interaction between the visible side and the inner side of the mould platen forming the visible side, usually the nozzle-side mould platen, is prevented or at least reduced.

This object is achieved, for an injection-moulding method according to claim 1, by at least one protective measure being provided with which the inner surface of the respective mould platen pointing towards the mould cavity, especially the other preferably nozzle-side mould platen, is protected against adverse mechanical effects during an advancing movement of the mould core.

In this way variants of a moulded part can advantageously be manufactured for example, which with in principle the same shape and dimension, differ in particular merely by the presence of one or more breakthroughs, whereby an adverse effect on the visible side of moulded parts without breakthroughs is prevented or at least reduced.

An inventive injection-moulding tool with which this can be achieved has especially a mould cavity delimited by at least one nozzle-side and at least one ejector-side mould platen and a mould core able to be moved in relation to one of the said mould platens in an advance and in a withdrawal direction, whereby the mould core is embodied such that, for manufacturing a moulded part with a breakthrough, it is able to be positioned at least partly within the mould cavity, and for manufacturing a moulded part without breakthrough it is able to be removed at least partly from the mould cavity. Damage to the inner surface of the respective mould platen, especially the nozzle-side mould platen during an advancing movement of the mould core, is prevented or at least reduced by at least one protective device.

Preferably the inventive method enables moulded parts, for example display panels for household appliances such as dishwashers, washing machines, tumble dryers, ovens, etc. or the like, to be manufactured largely free from damage to the visible surfaces of the moulded parts. In particular this avoids the tools used during the manufacturing of the respective moulded part causing visibly-disruptive impressions on the respective visible surface of the respective moulded part. In particular control panels, especially for household appliances, where the aesthetic demands are especially high, can be manufactured without any problems using this method.

The advantageous embodiments and developments of the invention explained here and/or reproduced in the subclaims can be used in these cases—except for example in the event of unique dependencies or alternates which cannot be combined—individually or in any given combination with each other.

BRIEF DESCRIPTION OF THE DRAWINGS

The invention and its advantageous embodiments and developments and their advantages, especially the different variants of protective measures or protective devices, will now be explained in greater detail with reference to the enclosed drawings. The drawings are schematic sectional diagrams in each case, showing.

DETAILED DESCRIPTION OF EXEMPLARY EMBODIMENTS OF THE PRESENT INVENTION

Figure 1:
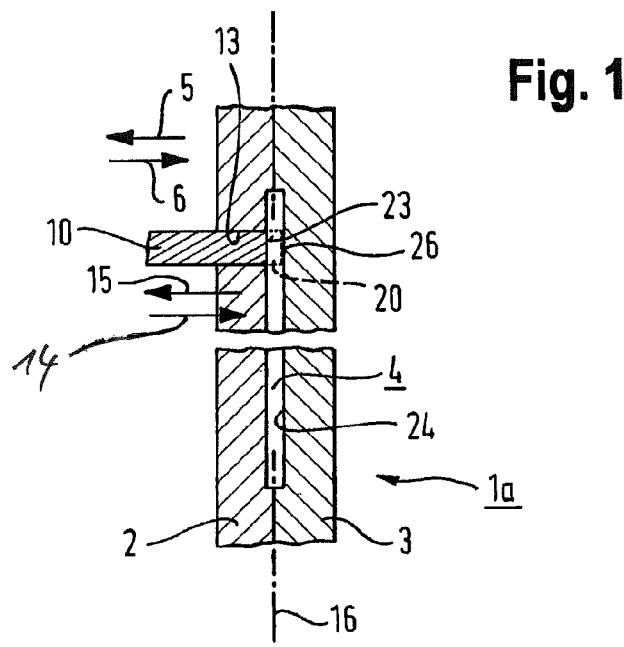
FIG. 1 an injection moulding tool with a nozzle-side and an ejector-side mould platen, whereby these delimit a mould cavity, and a mould core embodied as a movable stamp, FIG. 2 a cross-sectional perspective of the injection moulding tool from FIG. 1, of which the mould cavity is filled with plastic material for manufacturing a moulded part without breakthrough, FIG. 3 a cross-sectional perspective of the moulded part ejected from the injection moulding tool of FIG. 2, FIG. 4 an injection moulding tool with a mould core which is fixed detachably to the ejector-side mould platen, FIG. 5 a moulded part ejected from the injection moulding tool of FIG. 4, FIG. 6 an injection moulding tool corresponding to FIG. 4, whereby the mould core creating a breakthrough in a moulded part is replaced by a mould core which does not create a breakthrough, FIG. 7 a moulded part manufactured with an injection moulding tool from FIG. 6, FIGS. 8 to 10 injection moulding tools with a protective device in the form of a damping element, FIG. 11 an injection moulding tool with a mould core embodied as a movable stamp in its working position, whereby a gap is maintained between the mould core and the ejector-side mould platen, FIG. 12 an injection moulding tool with a mould core embodied as a movable stamp and a device for guaranteeing a two-stage advance of the mould core, FIG. 13 an injection moulding tool, to the end of which facing towards the nozzle-side mould platen is fixed a protective element made from a material which has a lower wear resistance than the material of the mould platen, FIG. 14 an injection moulding tool corresponding to FIG. 1 with a measurement device for measuring a parameter characterizing the distance between or the contact between the mould core and the nozzle-side mould platen, FIG. 15 the section XV from FIG. 14, FIG. 16 an injection moulding tool with an alternate arrangement of the ejector-side and nozzle-side mould platen.

To manufacture moulded part variants with and without breakthrough, display panels for example, especially control panels for household appliances such as dishwashers, washing machines, ovens, etc. or the like, two method variants or tool variants are possible. An example of the first variant is shown in FIG. 1, an example of the second variant in FIG. 4. What is common to both variants is that the injection moulding tool 1a, 1b has at least two mould platens, namely an ejector-side mould platen 2 and a nozzle-side mould platen 3, which if necessary can each be constructed from part platens, which delimit a mould cavity 4. In the figures (except for FIG. 16) only one nozzle-side and one ejector-side mould platen are shown in order to provide a simpler illustration of the invention, with these platens lying opposite one another. Molten plastic material is injected into the mould cavity 4 via an injection nozzle (not shown) from the nozzle-side mould platen 3. The injection moulding tool 1a, 1b is usually fixed to the chassis of an injection moulding machine (not shown). The nozzle-side mould platen 3 is supported for this purpose in the exemplary embodiment in a fixed position and the ejector-side mould platen 2 is supported movably in the opening direction 5 or in the closing direction 6 respectively. With both variants a mould core 10, 17 is provided, with this core or a part area of it, in the event of manufacturing a moulded part 7 with breakthrough 8 (FIG. 5) being positioned within the mould cavity so that, within said cavity, during an injection of plastic material 9, it keeps an area of the mould cavity 4 corresponding to the shape of the later breakthrough 8 free.

In the variant of the injection moulding tool 1a shown in FIG. 1 the mould core 10 is embodied as a movable stamp. The mould core 10 passes through an opening 13 in the nozzle-side mould platen 2 and is guided movably therein in an advance direction 14 and a withdrawal direction 15, whereby the movement path of the mould core 10 or the said directions extend transversely, especially at right angles, to the flat plane 16 (FIG. 1) spanned by the mould platens 2, 3, the position of which is merely indicated as a dashed and dotted line in FIG. 1. It runs at right angles to the plane of the drawing of FIG. 1 between the adjoining mould platens 2, 3. A mould core 17 is present in the injection moulding tool of FIG. 4 which is fixed detachably to the ejector-side mould platen 2. It is also conceivable however for the mould core 17 to be fixed independently or additionally thereto to the nozzle-side mould platen 3.

Figure 2:
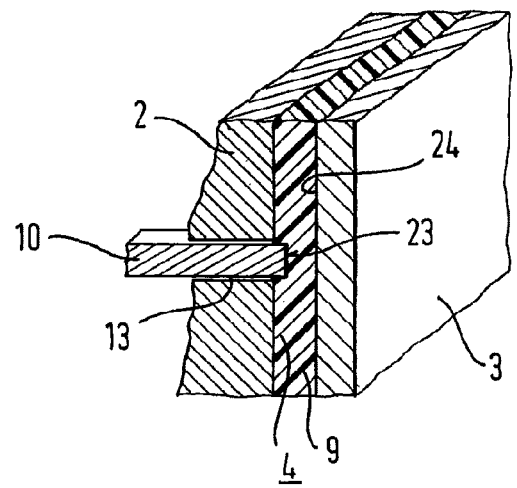
Figure 3:
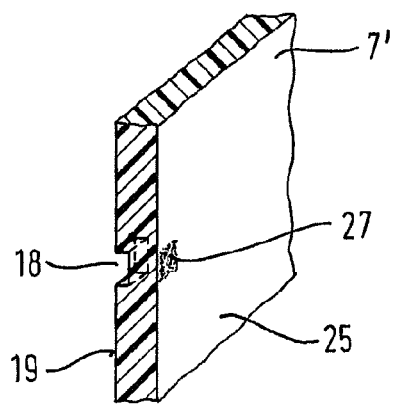
Figure 7:
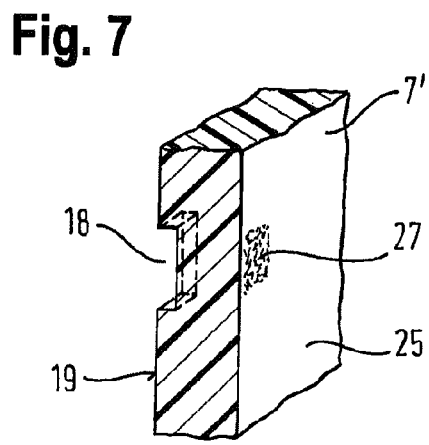

To manufacture moulded parts 7 with breakthrough 8 and moulded parts 7' without breakthrough 8, an injection moulding tool is used with a stamp-shaped mould core 10 movable relative to the ejector-side mould platen 2, using the following process: To manufacture a moulded part 7' without breakthrough (FIG. 7), starting from the situation shown in FIG. 1, the mould core 10 is left in the position shown, its rest position, and molten plastic material 9 is injected into the mould cavity 4. As regards the position of the mould core 10, it is conceivable for this to project some way into the mould cavity 4, as shown in FIG. 2. In this case, although a recess 18 complementary to the cross-sectional shape of the mould core 10 is formed on a side of the moulded part 7', which is its rear side 19, a breakthough passing though the moulded part is not formed however.

If a moulded part 7 with breakthrough 8 is to be manufactured, the mould core 10 is moved before the injection in the advance direction 14 into the mould cavity and brought into its working position. The corresponding position is indicated by the dashed line 20 in FIG. 1 and shown in FIG. 8 for example. With this advance movement the mould core 10 moved into its working position, with its end facing towards the nozzle-side mould platen 3 or with its end face side 23 present there, strikes the inner side 24 of the nozzle-side mould platen. In this case there is the danger of the inner side 24, which for the manufacture of moulded parts with a high-gloss viewing side 25 is polished accordingly, being adversely mechanically affected. An adverse mechanical affect in this case is to be understood as any type of damage to the inner side 24. Damage might even be barely noticeable at the beginning of the manufacturing of a batch of moulded parts. As the number of shots increases, i.e. an increasing number of moulded parts is produced, a damage pattern can form on the surface area 26 of the polished inner side 24 of the nozzle-side mould platen 3 struck by the mould core 10, which is detectable in a moulded part T without breakthrough as a corresponding surface fault 27, so that the moulded part T would have to be rejected.

Figure 4:
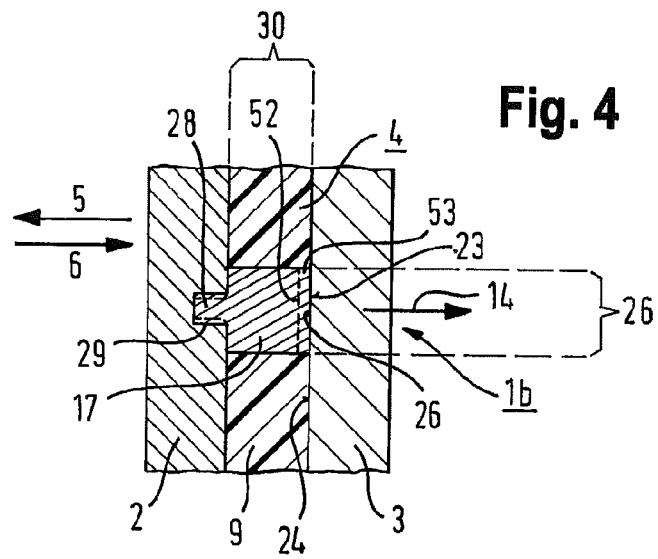
Figure 5:
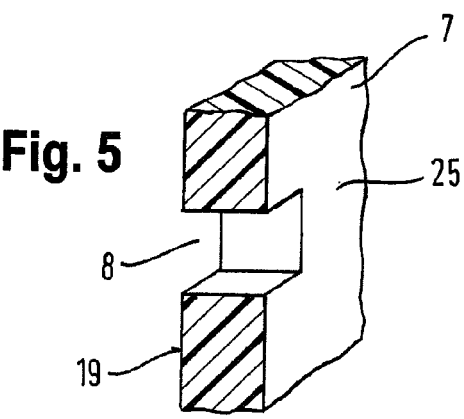
Figure 6:
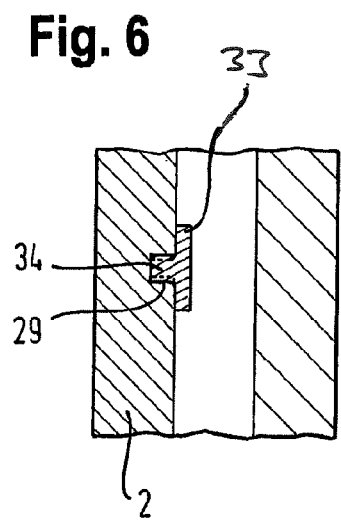

The same problems also arise in an injection moulding method using an injection moulding tool 1b in accordance with FIG. 4. The mould core 17 is actually fixed here to the ejector-side mould platen 2 for manufacturing a moulded part with a breakthrough, i.e. is not movable relative to the latter. On closure of the injection moulding tool however the ejector-side moulds platen 2 and with this the mould core 17 moves towards the nozzle-side mould platen 3. Thus the mould core 17 is also moved here in an advance direction 14—which corresponds to the closing direction 6 of the ejector-side mould platen 2—towards the nozzle-side, here fixed mould platen 3. The detachable fixing of the mould core 17 can for example be effected by a threaded bolt 28 present on the latter, which in the fixing state is screwed into a threaded hole 29 of the mould platen 2. The mould core 17 is fixed to the mould platen 2 in the opened state of the injection moulding tool 1*b* when the ejector-side mould platen 2 is moved away in the opening direction 5 from the other mould platen 3 and the threaded hole 29 is accessible as a result of a sufficient distance between the two mould platens 2, 3. On closure of the injection moulding tool 1*b* the ejector-side mould platen 2 is moved in the closing direction 6, with this movement corresponding to the advance direction 14 of the mould core 17. In the closed state of the mould platens 2, 3 the mould core 17 is in its working position.

After longer periods of operation and/or changing operating conditions, such as differing pressures and temperatures, there is the danger of the dimensional relationship of mould core 17 and mould platens 2, 3 changing slightly, so that the mould core 17 touches the inner side 24 of the mould platen 3 in a damaging way on closure of the injection-moulding tool 1*b*. The result is then a surface fault 27 on the visible side 25 of a moulded part T without breakthrough 8. To manufacture a moulded part 7' without breakthrough the threaded hole 29 present in the ejector-side mould platen 2 can be covered over with a cover part, on which a threaded pin 34 engaging into the threaded hole 29 is present. For a moulded part T without breakthrough, the cover part 33 creates a non-disruptive recess 18 on the rear 19 of the moulded part 7'.

Figure 8:
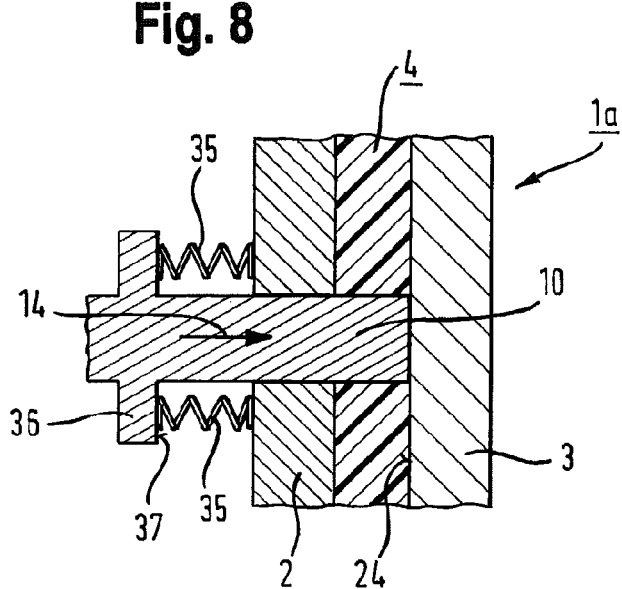

To prevent or reduce surface faults 27 various protective measures can now be taken or an injection-moulding tool 1*a*, 1*b* can be used which includes at least one corresponding protective device. One option is to reduce the impact of the mould core 10, 17 moved in the advance direction 14 on the inner side 24 of the nozzle-side mould platen 2 with the aid of a damping element and thereby to prevent damage to the inner side 24 or at least to reduce it, so that high numbers of shots can be obtained with the injection moulding tool 1*a*, 1*b*. A spring element 35 embodied as a helical spring is typically used as a damping element. With an injection moulding tool 1*a*, the impact of the mould core 10 on the mould platen 3 or on its inner side 24 respectively is damped by one or more spring elements 35 striking against the mould core 10 in the withdrawal direction 15 and striking a fixed counter bearing on the injection moulding tool 1*a* in the advance direction 14 (FIG. 8). The ejector-side tool platen 2 positioned in a fixed position in the closed state of the injection moulding tool 1*a* typically forms the counter bearing. So that the spring elements 35 can be supported on the mould core 10 the latter has a flange-shaped stop element 36 with a stop surface 37 pointing in the advance direction 14, on which the spring elements 35 are supported.

Figure 9:
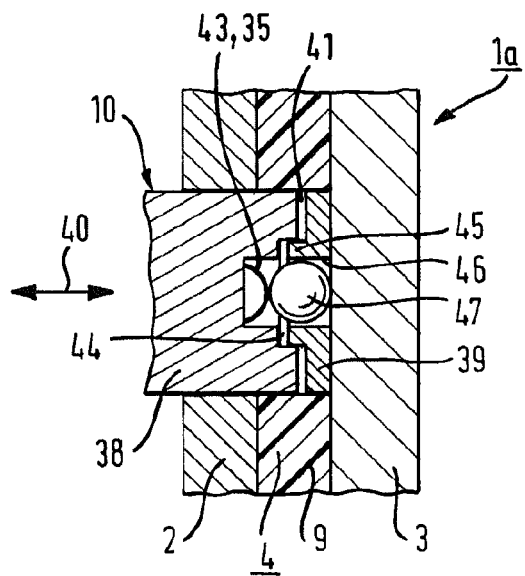
Figure 10:
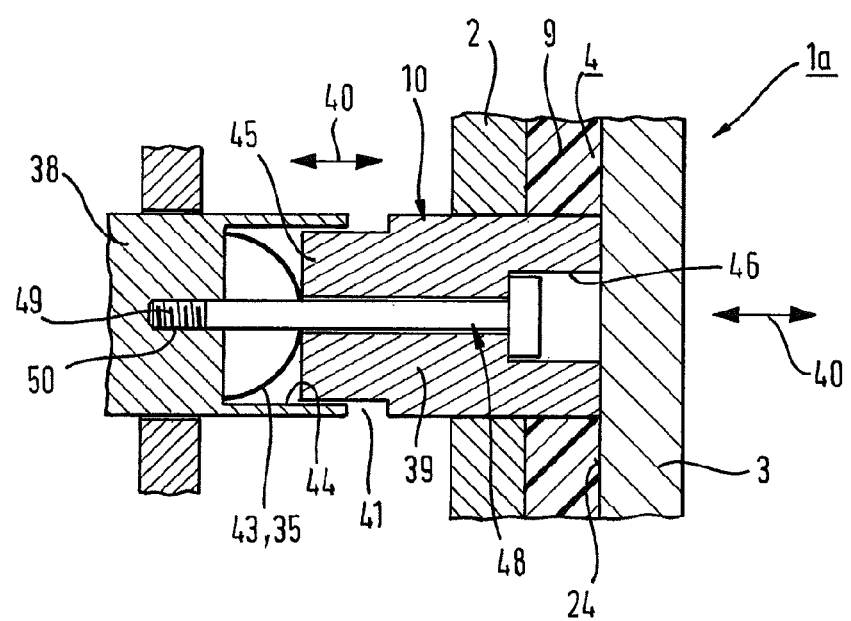

Another possibility for impact damping is shown in FIG. 9 and FIG. 10. This embodiment can be employed not only with an injection moulding tool 1*a* with a stamp-shaped mould core 10 guided movably on the ejector-side mould platen 2, but also with an injection moulding tool 1*b* with a mould core 17 able to be fixed detachably to the mould platen 2. To describe the embodiment discussed however, reference will be made by way of example to an injection moulding tool 1*a*. The mould core 10 comprises two part cores 38, 39, which are arranged in parallel to the direction 40 running in the advance direction 14 and/or the withdrawal direction 15, able to be moved relative to one another. The movability is guaranteed for example by a space 41 present between the part cores 38, 39. A spring element 35 embodied as a disk spring 43 is tensioned between the part cores 38, 39 for example. When the mould core 10 meets the inner side 24 of the ejector-side mould platen 3, the disk spring 43 is compressed and when this occurs the two-part cores move closer to each other in accordance with the deformation of the disk spring 43. The impact pulse of the mould core 10 on the inner side 24 is reduced by this and the danger of damage to the inner side 24 from the impact of the mould core 10 is reduced. For movable connection of the part cores 38, 39, these are connected to each other to enable them to be moved telescopically. To this end a recess 44 is present in part core 38 in which the disk spring 43 is arranged centrally and into which the other part core 39 projects with a section 45 shaped to complement the recess 44. The part core 39 facing towards the nozzle-side mould platen 3 has a hole 46 made through it in the axial direction or in direction 40 respectively. In the exemplary embodiment of FIG. 9 a stop element 47 typically embodied as a ball is inserted axially fixed in the hole 46. The disk spring 43 rests against this ball and presses the two part cores 38, 39 together. In the exemplary embodiment shown in FIG. 10 the hole 46 is penetrated by a screw 48 which passes with its shaft through the disk spring 43 and with an external thread 49 on its end engages into a threaded hole 50 in part core 38. The screw 48 is accessible with the injection moulding tool 1*a*, 1*b* opened from the inside of the ejector-side mould platen 2 so that the disk spring 43 can be exchanged in a simple manner. In the corresponding way the disk spring 43. The stop element 47 and the part core 39 can also be replaced in the exemplary embodiment of FIG. 9.

Figure 11:
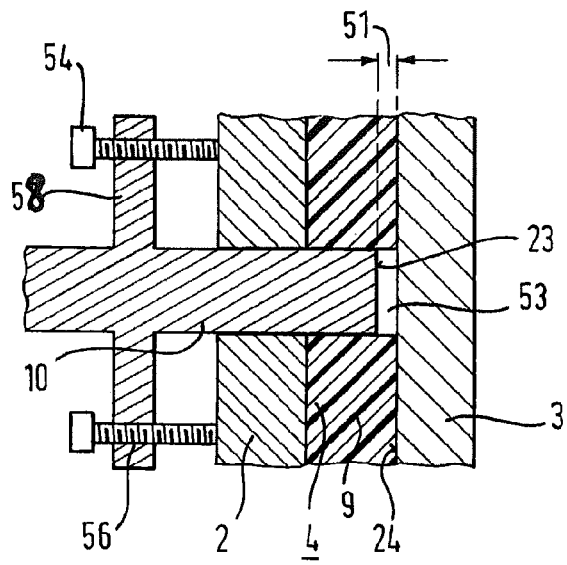
Figure 12:
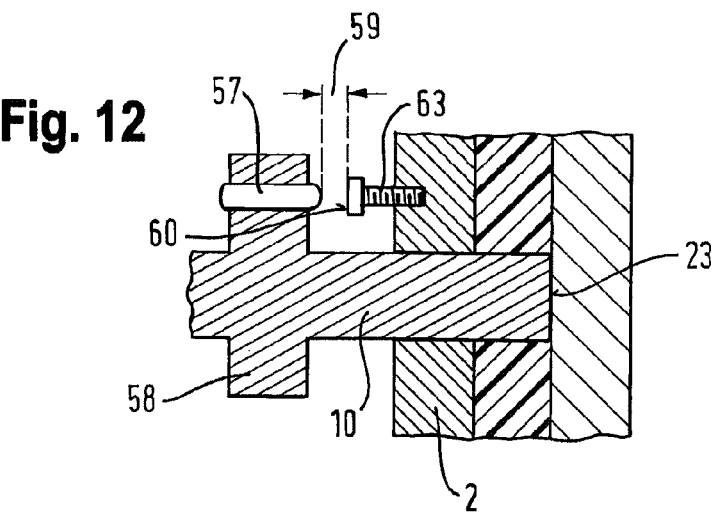

A further option for protecting the inner side 24 of the nozzle-side mould platen 2 against being damaged by a mould core is illustrated in FIG. 11, using an injection moulding tool 1*a* as an example. The mould core 10 is moved in the advance direction 14 into the mould cavity 4 far enough for a gap 53 to remain free between the end face side 23 of the mould core 10 and the inner side 24. This gap width is dimensioned so that plastic material 9 injected into the mould cavity, with the respective injection and tool parameters obtaining at the time, such as the injection pressure and the viscosity of the plastic material, does not get into the gap 53. The gap width 51 of the gap 53 naturally varies depending on the respective plastic material used, the injection pressure and the injection temperature and the resulting viscosity of the material. The gap size is typically in the hundredths of millimeter range. The required gap width 51 can in principle be set in any given manner, such as by controlling the path of the mould core 10 as part of its forward movement for example. The gap width is regulated in a simple manner for example using one or more adjustment screws 54. These pass through threaded holes 56 of a carrier 58, typically embodied as a type of flange, moulded onto the mould core 10. By adjusting the adjuster screws 54 which for example rest with their opposite ends to the screw head on the outer side of the ejector-side mould platen 2, the gap width 51 can be varied. A gap 53 of the type described here can also be provided for an injection-moulding tool 1*b* in accordance with FIG. 4. The mould core 17 fixed to the mould platen 2 has a dimension in this case in the advance direction 14 which is slightly smaller than the width 30 of the mould cavity 4, so that a gap 53 remains free between the end face side 23 of the mould core 17 and the inner side 24. The corresponding position of the end face side 23 is indicated in FIG. 4 by a dotted line 52. As a result of the gap 53 a movement between mould core 10 or 17 and inner side 24 of the nozzle-side mould platen 3 is excluded. Also in the case of a mould core 10 guided movably on the mould platen 2, a gap 53 of the type discussed can be created, by a mould core 10 with the length reduced by the gap width 51 being used. Maintaining a constant gap 53 or its gap width 51 respectively can also be guaranteed by using materials, such as special alloys, for the mould core 10, 17 which, in respect of their length extension, largely correspond to the materials used for the mould platens 2, 3. This enables a change in the gap width 51 to be at least reduced.

A further option of preventing the inner side 24 of the nozzle-side mould platen 3 being adversely affected in an injection moulding tool 1a consists of a two-stage control of the mould core advance. In this case the mould core 10 is moved in a first stage with a rapid advance into a preliminary position and in the second step with the slow advance into its end position, in which it rests with its end face 23 on the inner side 4 of the mould platen 3. The second stage of the advance control can in such cases be undertaken as a result of the slow advance movement so that mechanical damage to the inner side 24 is prevented in practice. Because of the two-stage control however the main part of the advance can initially be carried out with a sufficiently high speed for the duration of the overall advance of the mould core 10 to move within tolerable framework. A device for controlling the advance of the mould core 10 in two stages typically comprises a movement sensor 57 which is present in a carrier 58 moulded in the shape of a flange onto the mould core 10. The movement sensor 57 is designed such that it measures the distance 59 to a reference surface on the ejector-side mould platen, typically in a non-contact manner. The space 59 between reference surface 60 and movement sensor 57 can be variable, for example by the reference surface 60 being formed by the head side of an adjustment screw 63 fixed on the ejector-side mould platen 2. In quite general terms the movement of the mould core 10 can be controlled via a sensor system typically comprising sensors and an appropriate closed-loop control circuit.

Figure 13:
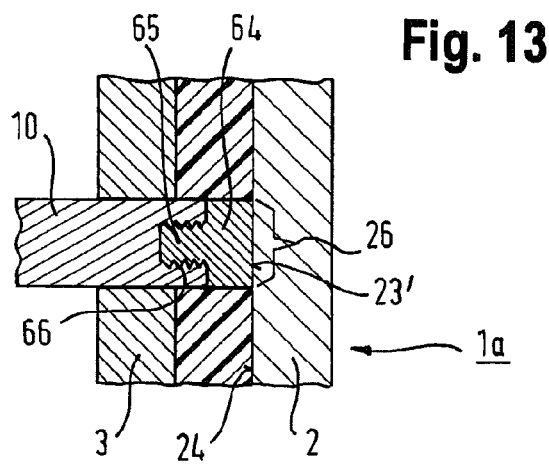

A further protection option is shown in FIG. 13 using injection moulding tool 1a as an example. The end of the mould core 10 facing towards the nozzle-side mould platen 2 is provided with a protective element 64 made from a material which has a lower wear resistance than the material of the nozzle-side mould platen 2. If there is an impact between the mould core 10 and the inner side 24, mechanical wear of the surface area 26 of the inner side 24 struck by the end face surface 23' of the protective element 64 is prevented in practice by this. The protective element 64 can be fixed to the mould core 10 in different ways, for example via a threaded pin 65 moulded on its side facing away from the mould platen 2 which is screwed into a corresponding threaded hole 66 on the end of the mould core 10 facing towards the mould platen 2. A protective element 64 of the type described above can also be used in an injection moulding tool 1b with a mould core 17 fixed detachably to the mould platen 3.

Figure 14:
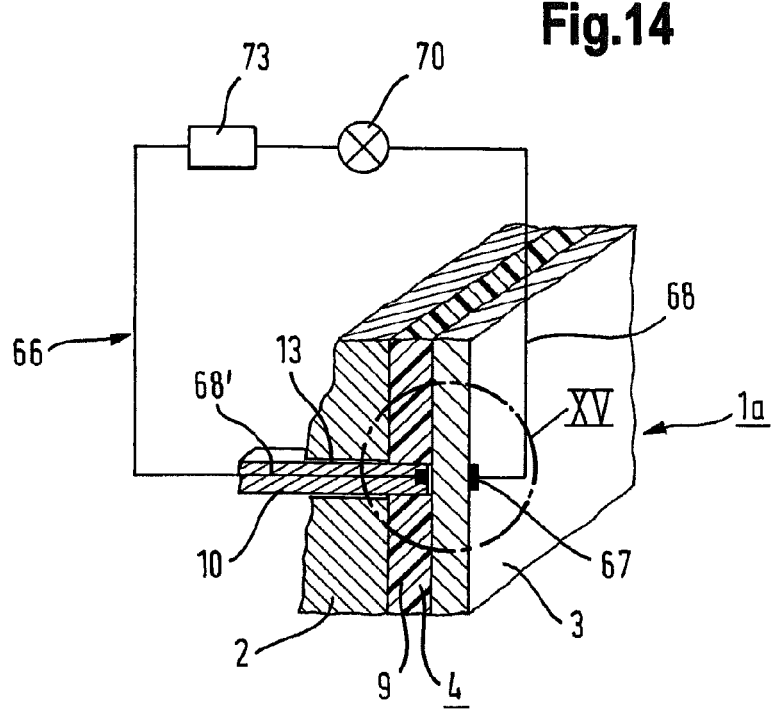
Figure 15:
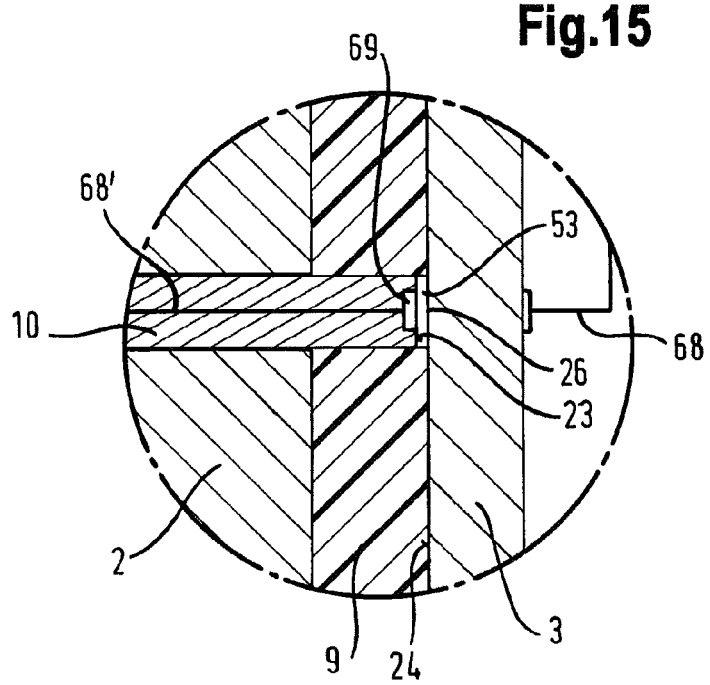

Especially in an execution of the method with an injection moulding tool 1a, 1b in which a gap 53 is to be maintained between the mould core 10, 17, it is expedient to determine a parameter correlated with the gap width 51, for example an electrical field strength, a capacitance, a magnetic field or the like during the injection moulding process for example. Preferably, since it is simple to implement, the electrical resistance between the mould core 10, 17 and the nozzle-side mould platen 3 is determined. As is illustrated in FIGS. 14, 15 with reference to an injection moulding tool 1a with movable mould core 10, for resistance measurement the mould platen 3 and the mould core 10 are connected into a circuit 66 featuring a resistance measurement device (not shown) such that the mould platen 3 is in contact at a contact point 67 with an electrical line 68 of the circuit 66 and a contact element 69 is positioned on the end face side 23 of the mould core 10 to which an electrical line 68' of the circuit 66 is connected. The contact element 69 is preferably arranged so that it is flush with the end face side 23 of the mould core 10. The electrical line 68' is preferably arranged within the mould core 10 and, like the contact element 69, is insulated in relation to the mould core 10 which usually consists of metal. Connected into the circuit 66 for example are a signal generator 70 and/or an electronic evaluation unit 73. Provided a gap 53 is present, the resistance between mould core 10 and mould platen 3 is infinitely large. When the width of the gap 53 reduces during the process such that the end face side 23 of the mould core 10 and thus the contact element 69 rest on the inner side 24 of the nozzle-side mould platen 3, a current flows between the said parts so that the above-mentioned resistance measurement device establishes a finite resistance. With the aid of the evaluation unit 73 a suitable warning signal can then typically be generated or the signal generator can be activated.

A measurement of the resistance or measurement of a parameter of the above type can however not simply be used for monitoring a gap 53. It is also useful in the situations in which the mould core 10, 17 touches the inner side 24 of the mould platen 3. If the surface quality of the inner side 24 or of the end face side of a mould core 10, 17 touching the latter has worsened, this can cause a change in the electrical contact between mould core 10, 17 and mould platen 3, which in its turn is able to be detected by an electrical resistance which changes, possibly increases for example. In this way a continuous monitoring of the injection moulding process can be undertaken and suitable measures taken for critical values of said resistance in order to re-establish a fault-free state for example by replacing or adjusting a mould core 10, 17 and/or replacing a protective element 64.

FIG. 16 shows a variant of a mould platen having two ejector-side mould platens 2, 2', i.e. with an opening and closing direction 5, 6 or 5', 6' supported movably on an injection moulding machine. The said directions of the mould platens 2, 2' moving towards each other and away from each other run at right angles to one another here in the exemplary embodiment. As an alternative they can run at any given angle transverse to one another. A mould core 10' is supported movably on the mould platen 2, whereby its movement path runs so that it is able to be moved into a part section 74 present between the mould platen 2' and the mould platen 2. The movement path 75 of the mould core 10' makes an angle 76 with the opening or closing direction 5, 6 of the mould platen 2. The mould core 10' can alternatively also be present on the mould platen 2', which is indicated by the dashed line 77 in FIG. 16.

What is claimed is:

1. An injection-moulding process for selectively manufacturing a display panel for a household appliance with or without a breakthrough, using an injection-moulding tool having at least one mould cavity delimited by at least one nozzle-side mould platen and by at least one ejector-side mould platen and a mould core at least partly positionable in the mould cavity and movable relative to at least the nozzle-side mould platen in an advance direction and a withdrawal direction, whereby for movement in the advance direction the mould core is moved closer to one of the nozzle-side mould platen and the ejector-side mould platen, and for movement in the withdrawal direction the mould core is moved away from the respective nozzle-side mould platen or ejector-side mould platen, the steps of:

to manufacture the display panel with the breakthrough, positioning the mould core in the mould cavity, and to manufacture the display panel without the breakthrough, removing the mould core at least partly from the mould cavity, protecting an inner surface of one of the nozzle-side mould platen and the ejector-side mould platen facing the mould cavity against adverse mechanical effects during movement of the mould core in the advance direction by damping out an impact of the mould core on the inner surface of the respective nozzle-side mould platen and ejector-side mould platen during an advance of the mould core in the direction of one of the nozzle-side mould platen and the ejector-side mould platen, wherein:

damping of the mould core is performed with a damping element, and the mould core is formed of two partial cores which are movable relative to one another along a common axis in a direction running in parallel to the advance direction, with a damping element being tensioned between the two partial cores.

2. The injection-moulding process of claim 1, further comprising the steps of:

advancing the mould core with a rapid advance into a preliminary position, and subsequently advancing the mould core with a slower advance into an end position.

3. The injection-moulding process of claim 2, wherein the preliminary position and the end position of the mould core are controlled by a movement sensor.

4. The injection-moulding process of claim 1, wherein protecting the inner surface of one of the nozzle-side mould platen and the ejector-side mould platen comprises providing a mould core having a protective element affixed to an end of the mould core facing one of the nozzle-side mould platen and the ejector-side mould platen, with the protective element made from a material having a lower wear resistance than a material of the mould platen interacting with the mould core.

5. The injection-moulding process of claim 4, wherein the protective element is detachably affixed to the mould core.

6. The injection-moulding process of claim 1, further comprising the step of monitoring the injection-moulding process by determining a parameter correlated with a distance or contact between the mould core and one of the nozzle-side mould platen and the ejector-side mould platen.

7. The injection-moulding process of claim 1, wherein the household appliance is a dishwasher, washing machine, tumble dryer or oven.

8. An injection-moulding tool for selectively manufacturing a display panel for a household appliance with a breakthrough and the display panel without the breakthrough, comprising:

at least one nozzle-side mould platen and at least one ejector side mould platen, with the at least one nozzle-side mould platen and at least one ejector side mould platen delimiting at least one mould cavity, and a mould core movable in the at least one mould cavity relative to at least one of the nozzle-side mould platen and the ejector-side mould platen in an advance direction and a withdrawal direction, whereby the mould core is constructed to be positioned at least partly within the mould cavity for manufacturing the display panel with the breakthrough and to be removed at least partly from the mould cavity for manufacturing the display panel without the breakthrough, the mould core comprising two parts which are both adapted to advance independently of the nozzle-side mould platen and ejector side mould platen as the mould core is moved in the advance direction to manufacture the display panel with the breakthrough and movable relative to each other along a common axis in the advance direction and along the common axis in the withdrawal direction to protect an inner surface of one of the nozzle-side mould platen and the ejector-side mould platen against adverse mechanical effects during movement of the mould core in the advance direction.

9. The injection-moulding tool of claim 8, wherein the ejector-side mould platen comprises an opening, with the mould core constructed as a movable stamp movably passing through the opening in the advance and withdrawal direction between a rest position and an operating position, wherein in the operating position attained by moving the mould core from the rest position in the advance direction, the mould core projects into the mould cavity without obstructing an area of the mould cavity corresponding to the breakthrough, and wherein in the rest position attained by moving the mould core from the operating position in the withdrawal direction, the mould core does not project into the mould cavity at all or only far enough so as to prevent formation of the breakthrough in the display panel.

10. The injection-moulding tool of claim 8, further comprising a damping element weakening an impact of the mould core on the inner side of one of the nozzle-side mould platen and the ejector-side mould platen during movement in the advance direction.

11. The injection-moulding tool of claim 10, wherein the damping element is tensioned between the two parts.

12. The injection-moulding tool of claim 8, further comprising a device providing a two-stage control of movement of the mould core in the advance direction, wherein in a first stage the mould core is advanced rapidly into a preliminary position and in a second stage the mould core is advanced slowly into an end position where the mould core touches the inner surface of one of the nozzle-side mould platen and the ejector-side mould platen.

13. The injection-moulding tool of claim 12, further comprising a movement sensor for controlling the preliminary position and the end position.

14. The injection-moulding tool of claim 8, further comprising a protective element made from a material having a lower wear resistance than a material of the mould platen and affixed to an end of the mould core interacting with one of the nozzle-side mould platen and the ejector-side mould platen.

15. The injection-moulding tool of claim 14, wherein the protective element is detachably affixed to the mould core.

16. The injection-moulding tool of claim 8, further comprising a measuring device for measuring an electrical resistance between the mould core and one of the nozzle-side mould platen and the ejector-side mould platen.

17. The injection-moulding tool of claim 8, further comprising a damping element configured to dampen movement of the mould core.

18. The injection-moulding tool of claim 17, wherein the damping element is a spring.

19. The injection-moulding tool of claim 8, wherein the two parts have a fixed range of movement relative to one another.

20. The injection-moulding tool of claim 8, further comprising a damping element, wherein the damping element is compressed between the two parts during movement in the advance direction.

21. The injection-moulding tool of claim 8, wherein:
a space is provided between the two parts and within the mould cavity when the mould core is fully inserted into the mould cavity.

22. The injection-moulding tool of claim 8, wherein:
a facing surface of the mould core is adapted to contact an inner surface of the mould cavity that opposes the mould core in the advance direction when the display panel is made with the breakthrough, and
the at least one protective device is adapted to allow the facing surface to stop moving when the facing surface contacts the inner surface of the mould cavity while another portion of the mould core continues to move in the advance direction.

23. The injection-moulding tool of claim 8, wherein:
a facing surface of the mould core is adapted to contact an inner surface of the mould cavity that opposes the mould core in the advance direction when the display panel is made with the breakthrough, and
the facing surface is moveable in the advance direction and the withdrawal direction with respect to another portion of the mould core.

24. The injection-moulding tool of claim 8, wherein the mould core is adapted to be selectively withdrawn from the mould cavity for manufacturing the display panel without the breakthrough and inserted into the mould cavity for manufacturing the display panel with the breakthrough.

25. The injection-moulding tool of claim 8, wherein:
a facing surface of the mould core is adapted to contact an inner surface of the mould cavity that opposes the mould core in the advance direction when the display panel is made with the breakthrough, and
the inner surface is adapted to produce a high-gloss finish on the display panel.

26. The injection-moulding tool of claim 8, wherein the mould cavity has a same depth with and without the breakthrough being provided.

27. The injection-moulding tool of claim 8, wherein the household appliance is a dishwasher, washing machine, tumble dryer or oven.

28. An injection-moulding tool for selectively manufacturing a moulded part with a breakthrough and a moulded part without a breakthrough, comprising:
at least one nozzle-side mould platen and at least one ejector side mould platen, with the at least one nozzle-side mould platen and at least one ejector side mould platen delimiting at least one mould cavity, and
a mould core movable in the at least one mould cavity relative to at least one of the nozzle-side mould platen and the ejector-side mould platen in an advance direction and a withdrawal direction, whereby the mould core is constructed to be positioned at least partly within the mould cavity for manufacturing the moulded part with a breakthrough and to be removed at least partly from the mould cavity for manufacturing the moulded part without a breakthrough, the mould core comprising two parts which are both adapted to advance independently of the nozzle-side mould platen and ejector side mould platen as the mould core is moved in the advance direction and axially movable relative to each other in the advance direction and the withdrawal direction to protect an inner surface of one of the nozzle-side mould platen and the ejector-side mould platen against adverse mechanical effects during movement of the mould core in the advance direction,
wherein a space is provided between the two parts and within the mould cavity when the mould core is fully inserted into the mould cavity.

* * * * *